Figure 1:
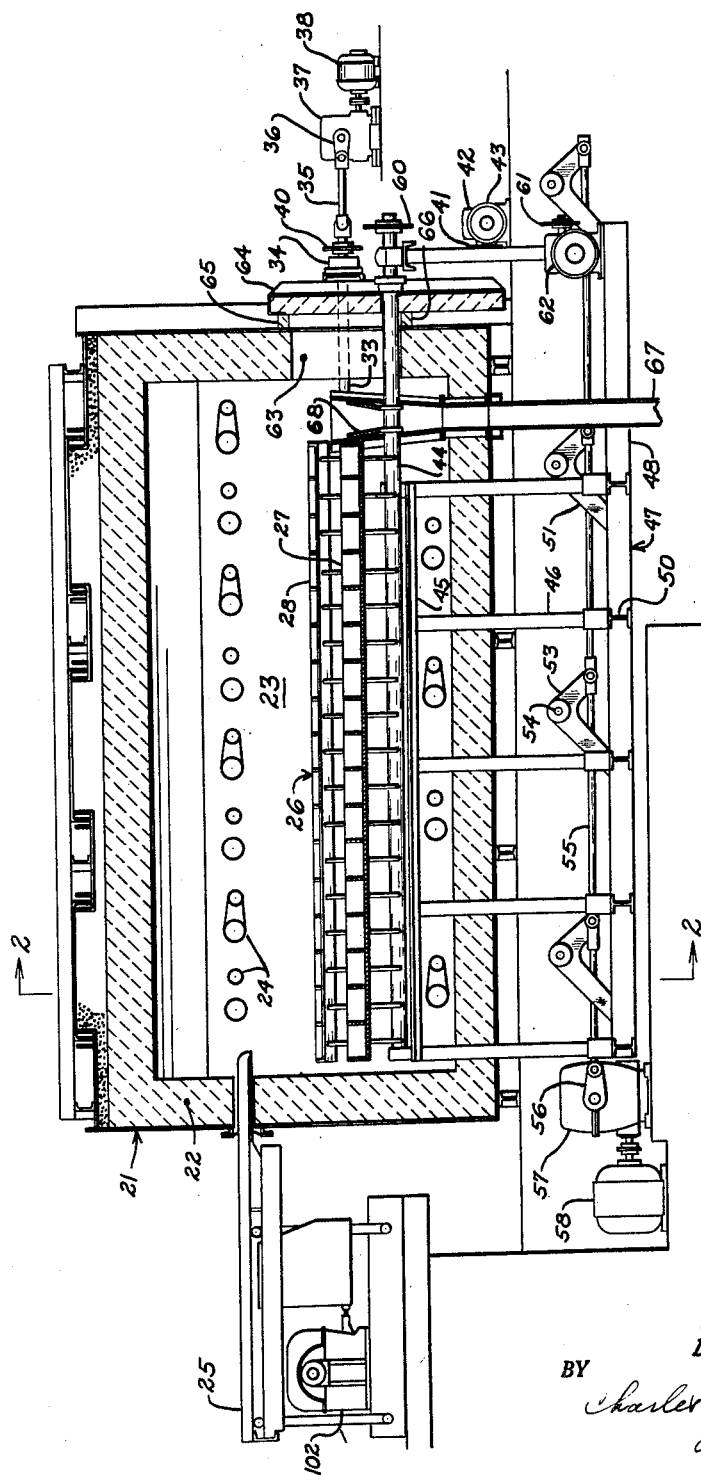
Figure 8:
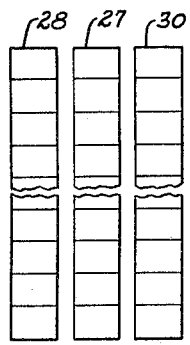
Figure 9:
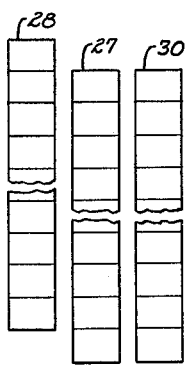
Figure 10:
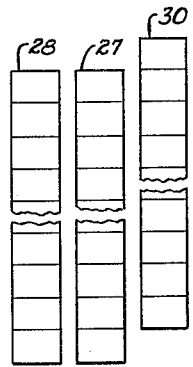
Figures 3, 4:
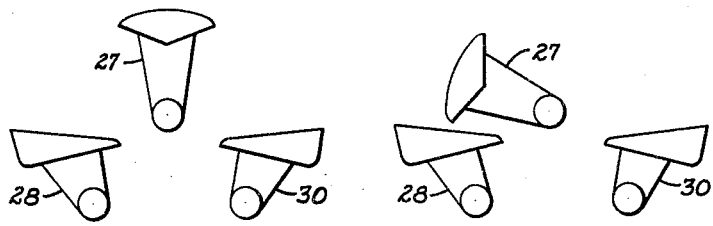
Figures 5, 6, 7:
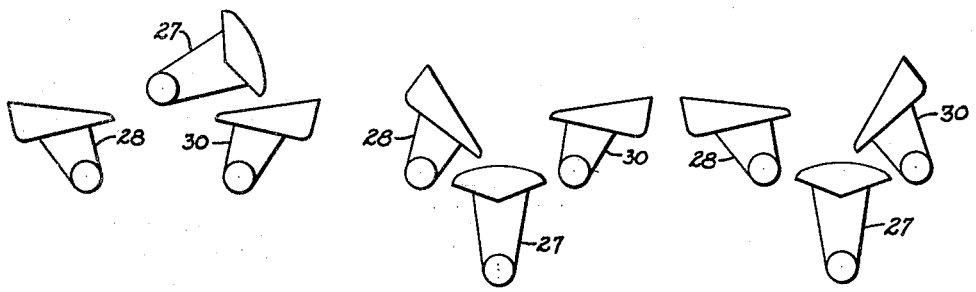
Figure 12:
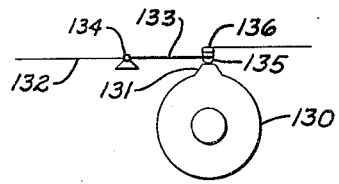

INVENTORS
C. CONE
D. C. STUART
BY
Charles S. Haughey
atty.

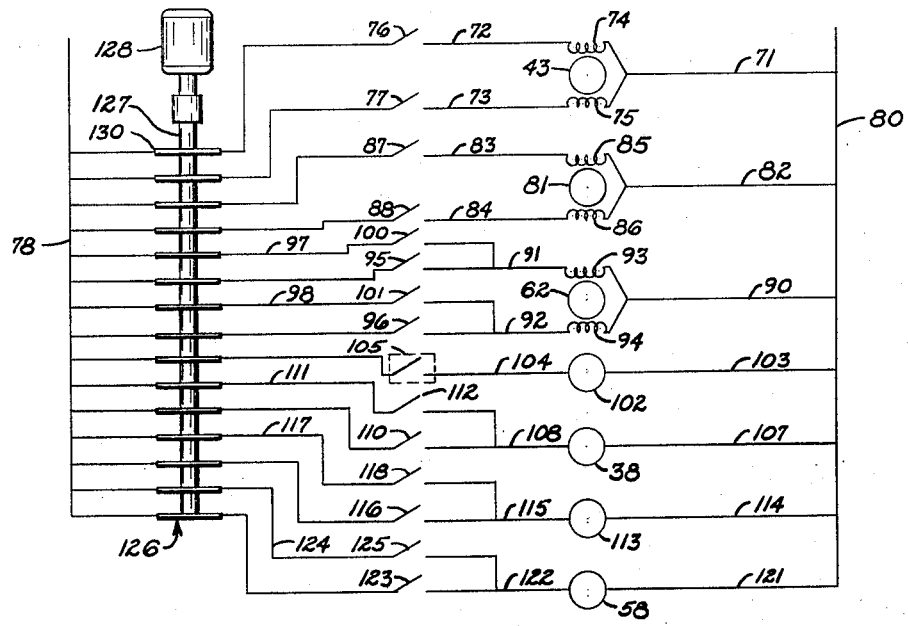
FIG 11
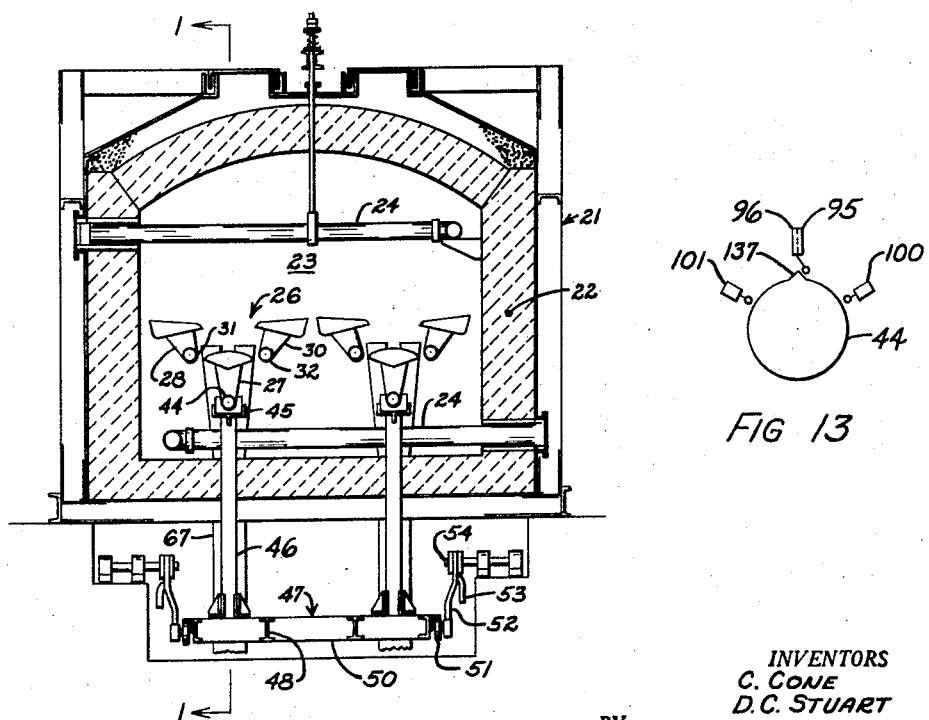
FIG 2
FIG 13
INVENTORS
C. CONE
D.C. STUART
BY
Charles S. Haughey
atty.

INVENTORS
C. CONE
D. C. STUART
BY Charles V. Haughey
atty.

Dec. 8, 1959  C. CONE ET AL  2,916,276
ATMOSPHERE FURNACE CONVEYOR
Filed Dec. 27, 1956  5 Sheets-Sheet 4

INVENTORS
C. CONE
D.C. STUART
BY
Charles S. Haughey
Atty.

Dec. 8, 1959    C. CONE ET AL    2,916,276
ATMOSPHERE FURNACE CONVEYOR
Filed Dec. 27, 1956    5 Sheets-Sheet 5
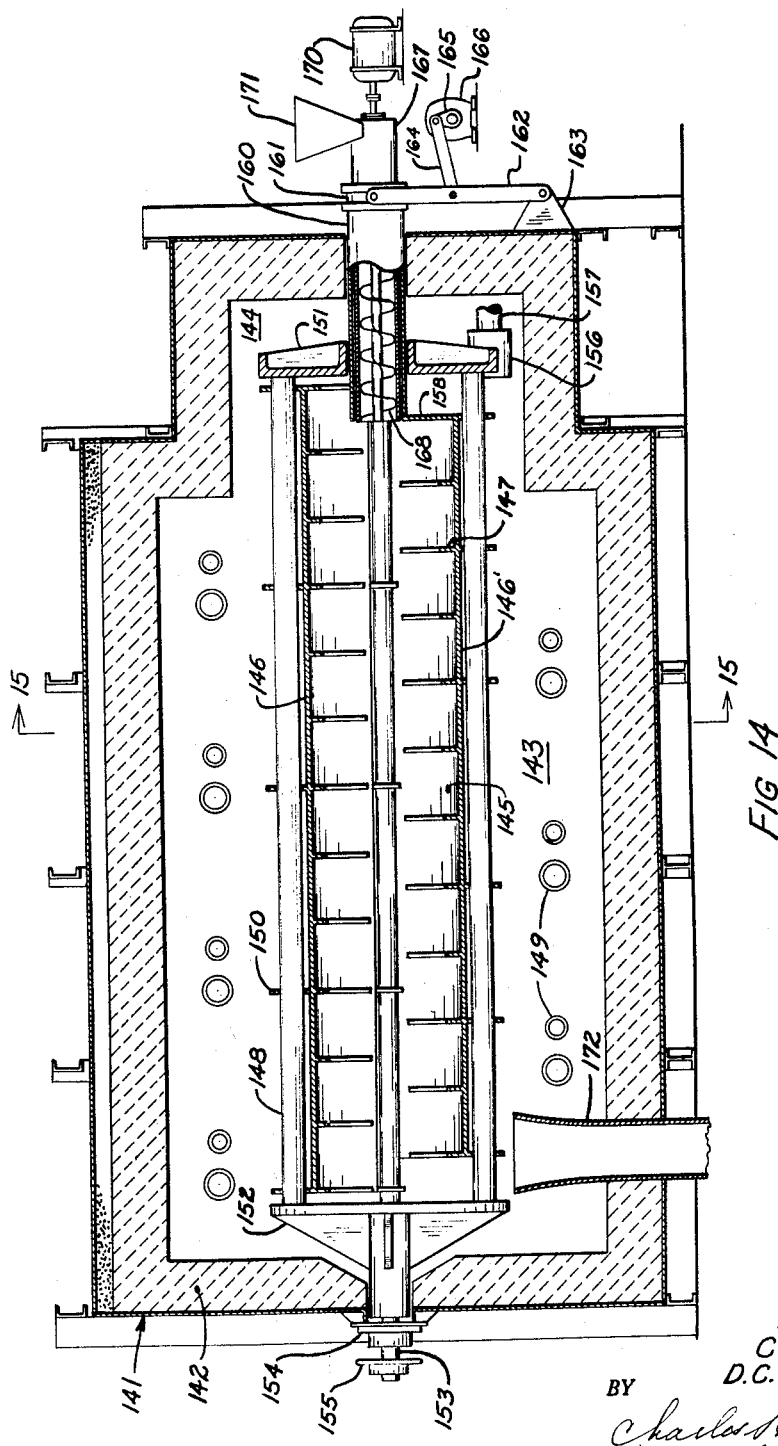
INVENTORS
C. CONE
D.C. STUART
BY
Charles Haughey
Atty.

United States Patent Office 2,916,276
Patented Dec. 8, 1959

2,916,276

ATMOSPHERE FURNACE CONVEYOR

Carroll Cone and Donald C. Stuart, Toledo, Ohio, assignors to Surface Combustion Corporation, Toledo, Ohio, a corporation of Ohio Application December 27, 1956, Serial No. 630,948

13 Claims. (Cl. 263—6)

This invention pertains to a furnace conveyor and more particularly to a conveyor for transporting work horizontally through an atmosphere furnace in a turbulent manner to subject the individual pieces of work more uniformly to the atmosphere therein.

The use of gaseous atmospheres in a furnace for various heat-treating operations is well known in the art. Although originally employed in batch furnaces only, atmospheres have more recently been used in continuous furnaces and are now relatively common.

Heat-treatment of small parts in an atmosphere furnace has been a problem since the beginning of this art. The employment of a rotary drum in atmosphere furnaces for small parts has overcome many of the difficulties. This type of drum is disclosed in the patent to Heyn, Number 2,624,561. Where the small parts are heat-treated in considerable numbers, however, it is frequently difficult to subject all the parts uniformly to the atmosphere so as to produce uniform results, such as case depth, in each of them. Various methods have been tested to overcome this difficulty with varying degrees of success. For instance, one method is to oscillate the drum as it carries the pieces through the furnace to tumble and thus more uniformly expose them. This and other methods have still been found to be inadequate for certain small parts such as those which tend to nest or stick together, as where they are made of shim stock. The drums are also unable to maintain accurate control over the time the pieces are in the chamber. This tends to produce even greater variation in the heat-treated work.

To overcome the above disadvantages, a method and apparatus have been developed for conveying parts through a furnace in a manner to expose even the most difficult parts uniformly to the atmosphere.

For further consideration of what is novel and the invention, refer to the following portion of the specification, the depending claims, and the accompanying drawing.

Figure 15:
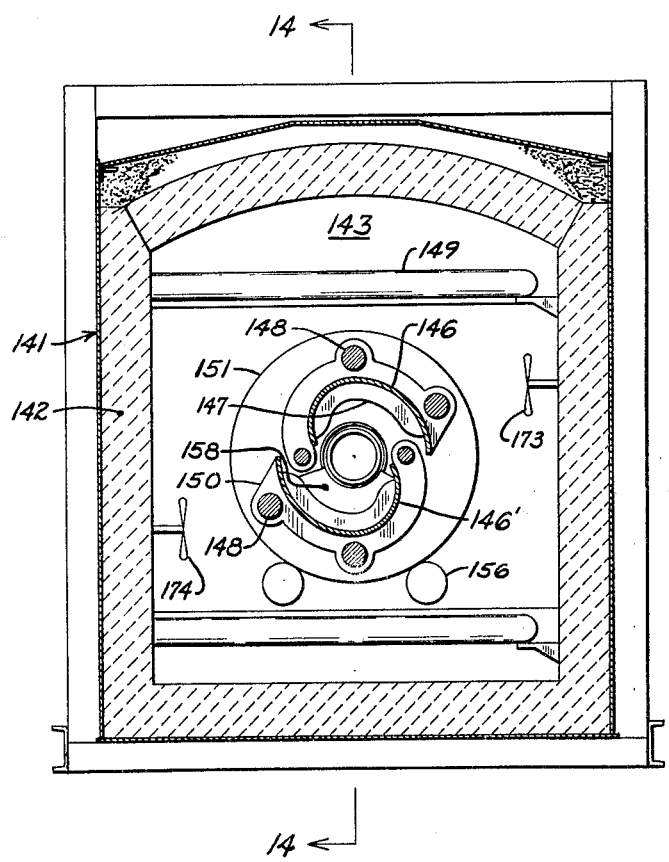

In the drawing:

Figure 1 is a cross-sectional view on line 1—1 of Figure 2 of apparatus embodying the invention, Figure 2 is a cross-sectional view on line 2—2 of Figure 1, Figures 3 to 7 are representations of a portion of the apparatus of Figures 1 and 2, Figures 8 to 10 are representations of rows of a portion of the apparatus of Figures 1 and 2, Figure 11 is a schematic representation of a circuit for controlling the apparatus of Figures 1 and 2, Figures 12 and 13 are representations of portions of the circuit of Figure 11, Figure 14 is a cross-sectional view on line 14—14 of Figure 15 of another furnace embodying the invention, and Figure 15 is a cross-sectional view on line 15—15 of Figure 14.

According to Figures 1 and 2, the furnace 21 comprises wall 22 defining a heat-treating chamber 23 which is heated by radiant tubes 24. Small parts to be heat-treated are fed to rows of receptacles 26 by a vibratory feeder 25. Rows 26 each comprise a center row of receptacles 27, and outer rows 28 and 30. The receptacles 28 are connected to a common shaft 31 and receptacles 30 are connected to a common shaft 32, the shafts being supported by vertical piers (not shown). Shaft 31 is connected to a rod 33 which extends outside the discharge end of the furnace through a bearing 34. The rod is connected to a linkage 35 which in turn is connected to an arm 36 which is rotated by a reducer 37 and motor 38. This permits the row to move in a reciprocatory manner, as does row 30 which is motivated in a similar manner. A sprocket 40 is keyed to rod 33 and is driven through a second sprocket 41 by means of a chain (not shown). Sprocket 41 is driven through a reducer 42 and a motor 43. This permits the row to move in an arc, as does row 30 which is driven by a similar mechanism. Hydraulic or pneumatic drive means may be preferable in many instances to the electric motors.

The row of receptacles 27 is connected to a common shaft 44 which is supported by U-shaped supports 45. These in turn are supported by a series of vertical beams 46 which extend through the bottom of the furnace to a framework 47 consisting of longitudinal beams 48 and lateral beams 50. Longitudinal beams 48 have flanges which are contacted by rollers 51 rotatably attached to arms 52. These arms are integrally connected to shorter arms 53 and are pivoted by a shaft 54. Arms 53 are pivotally connected to a shaft 55 which in turn is connected to an arm 56 rotated by a reducer 57 and motor 58. Shaft 44 extends outside the discharge end of the furnace, a sprocket 60 being attached to this end. This sprocket is driven through a sprocket 61 and a chain (not shown). Sprocket 61 is driven through reducer and motor 62. As arm 56 is rotated, causing framework 47 and row 27 to move up and down, shaft 44 moves vertically in a slot 63, the shaft 44 extending through a vertical cover 64 which moves up and down with the shaft and maintains a gas tight seal by contacting seals 65 and 66.

The operation of the conveyor is controlled through a circuit shown in Figure 11. A line 71 connects reversible windings 74 and 75 of motor 43, which oscillates row 28, to a main lead 80. The windings are also connected through lines 72 and 73 to a second lead 78, the two leads being connected to a source of current. Lines 72 and 73 contain normally closed limit switches 76 and 77 respectively which open the respective circuits when the receptacles reach predetermined positions. Motor 81, which oscillates row 30, has reversible windings 85 and 86 connected to lead 80 by line 82 and to lead 78 by lines 83 and 84 which contain limit switches 87 and 88 respectively. Motor 62, which oscillates row 27, has reversible windings 93 and 94 which are connected to lead 80 by line 90 and to lead 78 by lines 91 and 92 containing limit switches 95 and 96 respectively. As will be explained later, lines 97 and 98 containing limit switches 100 and 101 are used to by-pass limit switches 95 and 96. Motor 102 which drives vibrating conveyor 25 is connected to lead 80 by line 103 and to lead 78 by line 104 containing a timer 105 which controls the length of time the conveyor is on and therefore the amount of work it loads. Motor 38, which reciprocates row 28, is connected by line 107 to lead 80 and by line 108 to lead 78, the line 108 containing a limit switch 110. A line 111 containing a limit switch 112 is used to by-pass limit switch 110. Motor 113, which reciprocates row 30, is connected to lead 80 by line 114 and to lead 78 by line 115 containing limit switch 116. A line 117 containing limit switch 118 bypasses limit switch 116. Motor 58, which moves row 27 vertically, is connected to lead 80 by line 121 and to lead 78 by line 122 containing limit switch 123. Line 124 containing limit switch 125 by-passes limit switch 123.

The various lines connecting leads 78 to the various motors and windings are controlled by a cam arrangement 126 consisting of a shaft 127 rotated by a small motor 128. Shaft 127 contains a plurality of cams 130, one being used for each of the various lines. Each of the cams 130 contains one or more projections 131 (Figure 12), the number depending on how many times the step to be performed by the respective motor occurs in one cycle. A line 132 connected to lead 78 is employed with each cam and is connected to a spring 133 pivoted at 134. The spring contains a contact 135 which rides on cam 130 and projection 131. A second contact 136 is employed to complete a circuit from lead 78 through the various motors and windings when contact 135 is in its upper position as controlled by projection 131.

Current actuating the various motor windings is thus controlled through the cams 130 and projections 131 and also by means of the limit switches. Preferably, each cam 130 has its projection 131 cut so as to make contact between contacts 135 and 136 for slightly more than a sufficient period of time for the motor to complete its function of reciprocating or oscillating the rows of receptacles. The positions of the receptacles are then positively controlled through the various limit switches which are appropriately placed to open when the receptacles are in their desired positions. Rather than the circuits being controlled by cams 130, the various limit switches may be interlocked so as to actuate the motors in their proper sequence as may be readily understood by one skilled in the art.

The motors 62, 38, 113, 58 have double lines with separate limit switches and cams to permit movement in the same direction after one of the limit switches has stopped the movement. Thus, assuming receptacles 27 are in the position shown in Figure 4, with the cam 130 and projection 131 pertaining to line 91 closing contacts 135 and 136 of this line, a circuit will be completed through winding 93 of motor 62. Receptacles 27 will then be driven clockwise until they reach the position shown in Figure 3. At this time, with normally closed limit switch 95 properly placed with respect to projection 137 on shaft 44, as shown in Figure 13, the limit switch 95 will be opened and stop motor 62. Shortly thereafter, the projection will have passed contact 135 and the respective contacts 135 and 136 will open. When it is desired to move receptacles to the position of Figure 5, a properly placed projection 131 on the cam 130 pertaining to bypass line 97 will close respective contacts 135 and 136 and complete a circuit through winding 93 again. The receptacles will then be moved to the position of Figure 5 at which time projection 137 will open limit switch 100 and the motor again will be stopped. Limit switches 95 and 96 may be replaced by a single, double-acting switch, if desired. The other by-pass lines operate in a similar manner and the other limit switches are appropriately placed similar to those controlling motor 62.

The operations may be performed in a variety of sequences, the following being for purposes of illustration only.

| Step No. | Operation | Motor actuated | Direction of movement | Initial position shown by figs. |
|---|---|---|---|---|
| 1 | Work is loaded in first receptacle of row 27. | 102 | — | 3 and 8. |
| 2 | Row 27 dumps into row 28 | 62 | ↙ | 4 and 8. |
| 3 | Row 27 moves to vertical position. | 62 | ↗ | 3 and 8. |
| 4 | Work is loaded in first receptacle of row 27. | 102 | — | Do. |
| 5 | Row 28 moves forward | 38 | → | 3 and 9. |
| 6 | Row 27 dumps into row 30 | 62 | ↘ | 5 and 9. |
| 7 | Row 27 moves to vertical position. | 62 | ↖ | 3 and 9. |
| 8 | Row 27 moves down | 58 | ↓ | 2 and 9. |
| 9 | Row 28 dumps into row 27 | 43 | ↘ | 6 and 9. |
| 10 | Row 28 moves to vertical position. | 43 | ↖ | 2 and 9. |
| 11 | Row 28 moves back | 38 | ← | 2 and 8. |
| 12 | Row 30 moves forward | 113 | → | 2 and 10. |
| 13 | Row 27 moves up | 58 | ↑ | 3 and 10. |
| 14 | Work is loaded in first receptacle of row 27. | 102 | — | Do. |
| 15 | Row 27 dumps into row 28 | 62 | ↙ | 4 and 10. |
| 16 | Row 27 moves to vertical position. | 62 | ↗ | 3 and 10. |
| 17 | Row 27 moves down | 58 | ↓ | 2 and 10. |
| 18 | Row 30 dumps into row 27 | 81 | ↙ | 7 and 10. |
| 19 | Row 30 moves to vertical position. | 81 | ↗ | 2 and 10. |
| 20 | Row 30 moves back | 113 | ← | 2 and 8. |
| 21 | Row 28 moves forward | 38 | → | 2 and 9. |
| 22 | Row 27 moves up | 58 | ↑ | 3 and 9. |
| 23 | Work is loaded in first receptacle of row 17. | 102 | — | Do. |

Note.—From this point, steps 6 to 23 are repeated to form a continuous cycle.

When the furnace is initially loaded, the first five steps are performed by actuating the respective motors manually, as by push buttons placed across the cams in the circuit. When step six is begun, the circuit is put into automatic operation with one complete rotation of shaft 127 producing one cycle of operation. After the work reaches the last receptacles of rows 28 and 30, it dumps into a chute 67, discharging into a quench tank or another conveyor. The chute contains two shields 68 affixed to shaft 44 which cover most of the area of the slots in the chute through which shaft 44 extends.

The above method of operating the receptacles permits two of the three rows to continuously be carrying parts. This is possible since parts are never passed from row 28 to row 30 but always pass between rows 27 and 28 or rows 27 and 30. A two row conveyor may also be used with one or both rows being reciprocated. Also, a single row may be used in which the parts are sequentially dumped from bucket to bucket. Either of these methods, however, inherently require that 50% of the receptacles are always empty so that only half the capacity is being utilized.

In the embodiment of Figures 14 and 15, the furnace 141 comprises wall 142 defining a vestibule 144 and a heating chamber 143 heated by radiant tubes 149. Receptacles 145 are provided for holding the work and are formed by arcuate plates 146, 146' and partitions 147. The arcuate plates are supported by shafts 148 to which they are connected by ribs 150. The shafts are fixed to a circular support 151 at the charge end of the furnace and another circular support 152 at the discharge end. Support 152 extends through the discharge end of the furnace and is connected to a shaft 153 which extends through a bearing 154 and has a sprocket 155 connected thereto. This sprocket is driven through a chain and sprocket arrangement (not shown) to rotate the conveyor assembly. Support 151 is supported by rollers 156 which are connected to shafts 157 which extend through the vestibule wall of the furnace and are rotatably supported in bearing blocks (not shown). Plate 146' has a member 158 connected thereto at the charge end which in turn is connected to a tube 160 containing a lateral groove 161. A yoke 162, pivotally supported by a plate 163 attached to the furnace casing or another immovable support, coacts with groove 161 to move the tube and plate in a reciprocatory manner. The yoke is moved by a shaft 164 which is driven by an arm 165 and motor 166. Concentrically located in tube 160 is a conveyor tube 167 containing a screw 168 rotated by a motor 170. A hopper 171 is provided for holding parts which are transported into the heating chamber by rotation of the screw.

After the work is charged into the conveyor assembly, it is transported through the furnace by rotation of plates 146 and 146', plate 146' being reciprocated to move the work forward. The plate may be reciprocated once every revolution or once every several revolutions as may be determined by a time clock. By regulating the number of revolutions in which plate 146' is reciprocated, the time in which the parts are moved through the furnace is subject to as wide variation as is desired and may be accurately controlled. Upon reaching the discharge end of the furnace the work is discharged directly from one of the receptacles or through a hole in one of the plates (not shown) into a discharge chute 172 connected to a quench tank or other receptacle.

The time in which the work is in the furnace is entirely independent of the speed of rotation of the arcuate plates. Hence the plates may be rotated at a relatively high speed to obtain great turbulent action in the work without shortening the time the work is subjected to the heat-treating operation. Also, the work, in being dumped from one row of receptacles to the other, receives a considerable jarring action which prevents the parts from sticking, or loosens parts that are stuck together.

Fans 173 and 174 are placed in the chamber to circulate the gaseous atmosphere through the openings between plates 146 and 146' as the receptacles rotate. The circulated atmosphere helps attain even greater uniformity in the work pieces.

The invention thus comprises a conveyor having a plurality of receptacles which are horizontally disposed in a heat-treating chamber. The parts are transferred from one receptacle to another with one of the receptacles being reciprocated at predetermined intervals.

The above has been intended to serve in an illustrative and not a limiting sense, the scope of the invention being limited only by the depending claims.

We claim:

1. A work conveyor for transporting work substantially horizontally through a furnace chamber comprising: a plurality of adjacent receptacles horizontally disposed within a furnace chamber, means to move at least one of said receptacles longitudinally in a reciprocatory manner, each of said receptacles having wall means defining a pocket adapted to receive a charge of work therein; and means for transferring the charge of work in a direction transverse to the longitudinal reciprocatory movement, from a pocket of one receptacle to a pocket of an adjacent receptacle.

2. A work conveyor for transporting work substantially horizontally through a chamber comprising: a plurality of adjacent receptacles horizontally disposed within a furnace chamber; means for moving at least a portion of said receptacles longitudinally in the chamber in a reciprocatory manner, each of said receptacles having wall means defining a pocket adapted to receive a charge of work therein; and means for transferring the charged work, in a direction transverse to the longitudinal reciprocatory movement, from a pocket of one receptacle to a pocket of an adjacent receptacle.

3. A work conveyor for transporting work substantially horizontally through a furnace chamber comprising: a plurality of adjacent rows of receptacles horizontally disposed within a furnace chamber, means to move at least one row longitudinally in a reciprocatory manner, each of said receptacles having wall means defining a pocket adapted to receive a charge of work therein; and means for transferring charges of work from the receptacles of one row to the receptacles of an adjacent row.

4. A work conveyor for transporting work substantially horizontally through a furnace chamber containing a gaseous medium comprising: a plurality of adjacent receptacles horizontally disposed within a furnace chamber, each of said receptacles having wall means defining a pocket adapted to receive a charge of work therein; means for moving at least a portion of said receptacle longitudinally in the furnace chamber in a reciprocatory manner; and means for transferring the charge of work from a pocket of one receptacle to a pocket of an adjacent receptacle, said receptacles being discontinuous whereby work pieces transferred from one receptacle to another pass through the gaseous medium within the chamber.

5. A work conveyor for transporting work substantially horizontally through a furnace chamber comprising: a plurality of adjacent rows of receptacles adapted to be horizontally disposed within the furnace chamber, means for moving at least a row horizontally in the chamber in a reciprocatory manner, means for raising at least one row above an adjacent row and for tilting the receptacles in said one row whereby the work pieces travel by means of gravity from the receptacles in said one row through the gaseous medium in the furnace chamber to the receptacles in said adjacent row.

6. A work conveyor for transporting work substantially horizontally through a furnace chamber comprising: a plurality of adjacent, parallel rows of receptacles adapted to be horizontally disposed within the furnace chamber, means for moving at least a row longitudinally in the chamber in a reciprocatory manner, means for raising one row above an adjacent row and for tilting the receptacles in said one row whereby the work pieces travel by means of gravity from the receptacles in said one row through the gaseous medium in the chamber to the receptacles in the adjacent row, and means for lowering said one row of receptacles below said adjacent row whereby work in said adjacent row is transferred to said one row by tilting the receptacles in said adjacent row.

7. A work conveyor for transporting work substantially horizontally through a furnace chamber containing a gaseous medium comprising: a plurality of rows of receptacles horizontally and parallelly disposed longitudinally in said chamber, a shaft for each of said rows to which the receptacles are attached, means for supporting said shafts in said chamber, means for moving at least one row longitudinally in the chamber in a reciprocatory manner, means for raising one row above an adjacent row and for tilting the receptacles in said one row whereby the work pieces travel by means of gravity from the receptacles in said one row through the gaseous medium in the chamber to the receptacles in the adjacent row, and means for lowering said one row of receptacles below said adjacent row whereby work in said adjacent row is transferred to said one row by tilting the receptacles in said adjacent row.

8. The method of conveying articles horizontally through a heat-treating chamber containing a gaseous atmosphere which comprises: placing the work in a first receptacle of a first row of receptacles, transferring work from said receptacle in said first row to a first receptacle in an adjacent row of receptacles, moving one of said rows longitudinally, and transferring the work in said first receptacle in said adjacent row to the second receptacle in said first row.

9. The method of conveying articles horizontally through a heat-treating chamber containing a gaseous atmosphere which comprises: placing the work in a first receptacle of a first row of receptacles, tilting said first row of receptacles whereby the work is transferred by gravity to a corresponding receptacle in an adjacent row, moving said second row longitudinally toward the discharge end of the heat-treating chamber, lowering said first row below the level of said adjacent row, and tilting the receptacles in said adjacent row whereby the work particles are transferred back to said first row by gravity.

10. A work conveyor for transporting work substantially horizontally through a furnace chamber containing a gaseous medium comprising: a plurality of rows of receptacles horizontally and parallelly disposed longitudinally in said chamber; a shaft for each of said rows to which the receptacles are attached; means for supporting said shafts in said chamber; a first motor and connecting means for reciprocating one shaft of one row; a second motor and connecting means for oscillating said one shaft whereby the receptacles attached thereto are tilted toward the receptacles in an adjacent row; a third motor and connecting means for oscillating the adjacent shaft of said adjacent row whereby the receptacles attached to said adjacent shaft are tilted toward the receptacles in said one row; a fourth motor and connecting means for vertically moving the receptacles in said adjacent row above and below the receptacles in said one row; vibratory loading means for loading the first receptacle in said adjacent row when in its upper position; and control means for operating said motors and said loading means whereby work is loaded in said first receptacle of said adjacent row, the work in said receptacles in said adjacent row is dumped into the corresponding receptacles in said one row, the receptacles in said adjacent row are lowered below the receptacles in said one row, the receptacles in said one row are moved the width of one receptacle toward the discharge end of the furnace, and the work in said receptacles in said one row is dumped into the receptacles in said adjacent row which are adjacent to the corresponding receptacles and toward the discharge end therefrom.

11. A work conveyor for transporting work substantially horizontally through a furnace chamber containing a gaseous medium comprising: a plurality of rows of receptacles horizontally and parallelly disposed longitudinally in said chamber; a shaft for each of said rows to which the receptacles are attached; means for supporting said shafts in said chamber; a first motor and connecting means for reciprocating one shaft of one row; a second motor and connecting means for oscillating said one shaft whereby the receptacles attached thereto are tilted toward the receptacles in an adjacent row; a third motor and connecting means for oscillating the adjacent shaft of said adjacent row whereby the receptacles attached to said adjacent shaft are tilted toward the receptacles in said one row; fourth motor and connecting means for vertically moving the receptacles in said adjacent row above and below the receptacles in said one row; vibratory loading means for loading the first receptacle in said adjacent row when in its upper position; a vertical slot adapted to be located in the rear wall of said chamber through which the shaft for said adjacent row extends; a cover attached to said shaft and covering said slot; a discharge chute located adjacent the discharge end of said one row and into which work from said one row is discharged; and control means for operating said motors and said loading means whereby work is transported through the chamber from said loading means to said discharge chute.

12. A work conveyor for transporting work substantially horizontally through a furnace chamber containing a gaseous medium comprising: two arcuate plates horizontally and parallelly disposed longitudinally in said chamber, said plates being arranged with respect to one another to substantially define a cylinder with the edges of said plates being overlapped with gaps therebetween; a plurality of walls laterally disposed on the inner faces of said plates to form a plurality of receptacles therewith; a vertical disc adjacent each end of the plates; a first shaft axially attached to one disc and adapted to extend through one end wall of the chamber; means for rotating said first shaft; means for rotatably supporting the other disc; a plurality of second shafts extending parallelly between said discs and supporting said plates; a horizontal tube attached to one of said plates, extending axially through said other disc, and adapted to extend through the wall of said chamber opposite said one wall; and means for reciprocating said tube.

13. A work conveyor for transporting work substantially horizontally through a furnace chamber containing a gaseous medium comprising: two arcuate plates horizontally and parallelly disposed longitudinally in said chamber, said plates being arranged with respect to one another to substantially define a cylinder with the edges of said plates being overlapped with gaps therebetween; a plurality of walls laterally disposed on the inner faces of said plates to form a plurality of receptacles therewith; a vertical disc adjacent each end of the plates; a first shaft axially attached to one disc and adapted to extend through one end wall of the chamber; means for rotating said first shaft; means for rotatably supporting the other disc; a plurality of second shafts extending parallelly between said discs and supporting said plates; a horizontal tube attached to one of said plates, extending axially through said other disc, and adapted to extend through the wall of said chamber opposite said one wall; means for reciprocating said tube; a discharge chute located adjacent the ends of said plates adjacent said one disc; a second tube concentrically located partially within the first tube; a hopper communicating with said second tube outside said chamber and first tube; a screw located in said second tube, the rotation of which moves work therethrough to said plates from said hopper; means for rotating said screw; and a fan in said chamber located at one side of said plates to circulate atmosphere gas in said chamber through the gaps formed between said plates.

References Cited in the file of this patent

UNITED STATES PATENTS 2,620,918     Fallon _____ Dec. 9, 1952